Patented Feb. 14, 1933

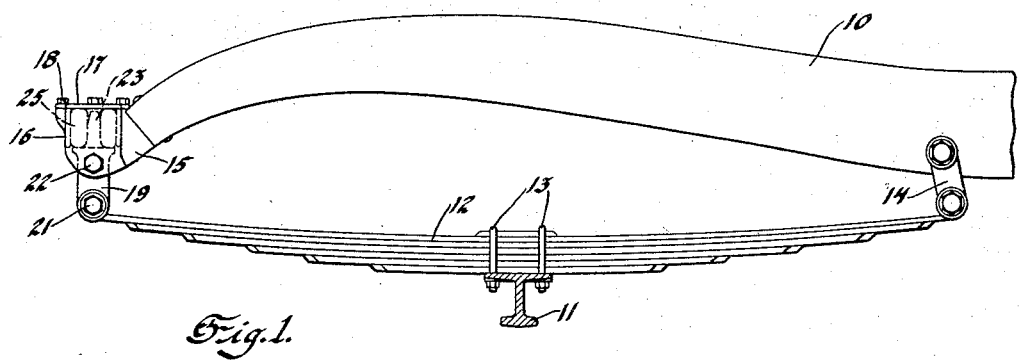
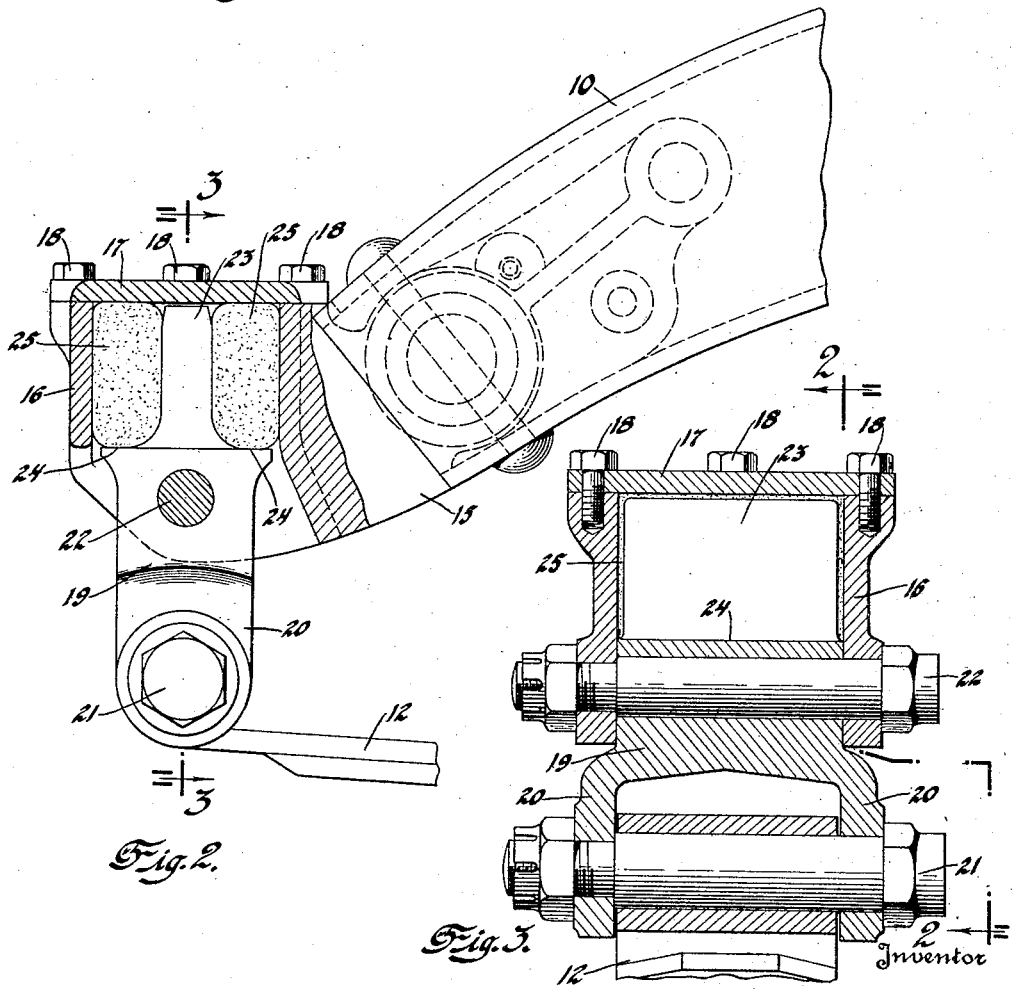

1,897,807

UNITED STATES PATENT OFFICE

WILLIAMSON D. KESSLER, OF FLINT, MICHIGAN, ASSIGNOR TO GENERAL MOTORS CORPORATION, OF DETROIT, MICHIGAN, A CORPORATION OF DELAWARE

SPRING MOUNTING

Application filed April 1, 1929. Serial No. 351,704.

When the left hand front wheel of a vehicle of the "left hand drive" type, which is provided with semi-elliptic front springs which are connected to the side members of the chassis frame in the conventional manner—i. e. by a simple pivotal connection at one end and by a shackle at the other—, strikes an obstruction in the road there is transmitted to the steering wheel a jerky movement. The transmission of this movement to the steering wheel can be prevented by connecting both ends of the left hand front spring to the chassis frame by shackles so that both ends of the spring can move longitudinally of the vehicle when the wheel strikes an obstruction. However, since, when both ends of the left hand front spring are allowed to move longitudinally of the vehicle, the spring, the left hand end of the front axle, and the left hand front wheel have a tendency to "wobble", and since the distance through which it is necessary to allow both ends of the spring to move to prevent the transmission of the before-mentioned jerky movement to the steering wheel is quite small, it is desirable that there be provided means to oppose movement of one end of the spring through a distance greater than that through which it is necessary to allow it to move to prevent the transmission of the before-mentioned jerky movement to the steering wheel.

This invention relates to means for connecting the left hand front spring of a motor vehicle of the "left hand drive" type to the chassis frame in such a manner as to prevent the transmission of a jerky movement to the steering wheel when the left hand front wheel of the vehicle strikes an obstruction, and, still to prevent "wobbling" of the spring, the left hand end of the front axle, and the left hand front wheel.

In the accompanying drawing there is illustrated a preferred embodiment of my invention for a description of which reference is made to the following specification.

In the drawing:

Figure 1 is a view in which is shown, in side elevation, the front end of the left hand side frame member of an automotive vehicle to which is connected a semi-elliptic load carrying spring.

Figure 2 is an enlarged view taken on the line 2—2 of Figure 3 and showing the connection between the front end of the load carrying spring and the side member of the chassis frame shown in Figure 1.

Figure 3 is a section taken on substantially the line 3—3 of Figure 2.

In the drawing, the reference character 10 indicates the left hand side member of the chassis frame, and the reference character 11, the front axle of an automotive vehicle of the type in which the drag link of the steering gear is connected to a steering arm which is connected to the left hand steering knuckle of the vehicle. The side member 10 of the chassis frame is resiliently connected to and supported from the front axle 11 by a semi-elliptic spring 12 which is connected intermediate its ends to the axle by U-bolts 13. The rear end of the spring 12 is connected to an intermediate portion of the side member of the chassis frame by a shackle 14, which is pivoted at its opposite ends to the side member of the chassis frame and to the spring.

To connect the front end of the spring 12 to the side member 10 of the chassis frame, there is provided a bracket 15 having a portion extending into the channel of the side member 10 of the chassis frame and rigidly secured thereto by suitable means. On the outer end of the bracket 15, there is formed a downwardly opening housing 16 of which the upper end is closed by a plate 17 which is removably and adjustably secured to the housing by screws 18. A member 19, of which the lower extremity is bifurcated to provide legs 20 to which the front end of the spring 12 which is positioned therebetween is pivotally connected by a bolt 21, has an intermediate portion positioned between and pivotally connected to the lateral side walls of the housing 16 by a bolt 22, and a reduced extension 23, which projects upwardly into the housing 16 and between which and the intermediate portion are provided shoulders 24 which substantially close the lower end of the housing. The spaces between the extension 23, the shoulders 24, the plate 17, and the side walls of the housing 16 are occupied by blocks 25 of a suitable resilient material, such, for instance, as rubber.

When the left hand front wheel of the vehicle strikes an obstruction, both ends of the spring 12 will move longitudinally of the vehicle and consequently no jerky movement will be transmitted to the steering wheel. The blocks 25 may be initially compressed or "pre-loaded" to any desired degree, so that they will oppose any desired amount of resistance to the movement of the front end of the spring and thereby prevent "wobbling" of the spring, the left hand front wheel and the left hand end of the front axle, by drawing the plate 17 down thereagainst by means of the screws 18.

It is obvious, that, although I have shown and described my invention as applied to the front end of the front spring of an automotive vehicle, it may, instead be applied to the rear end of the spring or to both ends thereof; that in vehicles of the "right hand drive" type the invention will be applied to the right hand front spring; that, in vehicles provided with certain types of steering gears, it may be applied to both of the front springs; and that, if desired, it may be applied to a rear spring or to rear springs, as well as to a front spring or springs; that the extension 23 of the member 19, though shown parallel to the main body thereof, may be located at any desired angle thereto to adapt the device for use with various types of chassis frames and/or various types of spring suspensions; for which reasons it is desired that it be distinctly understood that the invention herein disclosed is not to be limited to the structure herein disclosed except to the extent indicated by the appended claims.

I claim:

1. In a device of the class described, a housing, a link pivotally connected to the housing and having a portion extending thereinto and movable therewithin, shoulders on the link which substantially close the opening in said housing through which the link extends thereinto, and blocks of resilient material within the housing and bearing against the walls thereof, the portions of the link within the housing and the shoulders of the link.

2. In a device of the class described, a housing which is open on two sides, a link pivotally connected to the housing and provided with a portion which extends into the housing through one of the open sides thereof, shoulders on the link which substantially close the side of the housing through which the link extends, resilient material within the housing and bearing against the walls thereof, the portions of the link within the housing and the shoulders of the link, and a closure for the other open side of the housing by means of which the initial stress on the resilient material may be varied.

In testimony whereof I affix my signature.

WILLIAMSON D. KESSLER.